(12) United States Patent
Purchase et al.

(10) Patent No.: US 11,885,485 B2
(45) Date of Patent: *Jan. 30, 2024

(54) LIGHT TRANSMISSIVE STRUCTURES FOR REDISTRIBUTION OF LIGHT AND LIGHTING SYSTEMS INCLUDING SAME

(71) Applicant: BRIGHTVIEW TECHNOLOGIES, INC., Durham, VA (US)

(72) Inventors: Ken G. Purchase, Morrisville, NC (US); Bing Shen, Cary, NC (US)

(73) Assignee: BRIGHTVIEW TECHNOLOGIES, INC., Durham, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/700,990

(22) Filed: Mar. 22, 2022

(65) Prior Publication Data

US 2022/0214023 A1 Jul. 7, 2022

Related U.S. Application Data

(63) Continuation of application No. 16/625,830, filed as application No. PCT/US2018/040268 on Jun. 29, 2018, now Pat. No. 11,300,268.

(Continued)

(51) Int. Cl.
*F21V 5/00* (2018.01)
*G02B 5/02* (2006.01)
*G02B 5/04* (2006.01)

(52) U.S. Cl.
CPC ............ *F21V 5/005* (2013.01); *G02B 5/0215* (2013.01); *G02B 5/0231* (2013.01);
(Continued)

(58) Field of Classification Search
None
See application file for complete search history.

(56) References Cited

U.S. PATENT DOCUMENTS 5,997,156 A * 12/1999 Perlo ...................... F21V 5/002
362/337
7,190,387 B2 3/2007 Rinehart et al.
(Continued)

FOREIGN PATENT DOCUMENTS

CN 100578291 C 1/2010
CN 101896839 A 11/2010
(Continued)

OTHER PUBLICATIONS

International Search Report and Written Opinion received for PCT Application Serial No. PCT/US2018/040268 dated Sep. 26, 2018, 8 pages.
(Continued)

*Primary Examiner* — Ashok Patel
(74) *Attorney, Agent, or Firm* — Rauschenbach Patent Law Group, PLLC; Kurt Rauschenbach

(57) ABSTRACT

A light transmissive structure includes a light transmissive substrate having first and second opposing faces, and an array of microprism elements on the first face. Each microprism element includes a first inclined surface disposed at a first inclined angle relative to the second face, and a second inclined surface disposed at a second inclined angle relative to the second face. The first inclined angle is less than the second inclined angle, and a peak angle between the first inclined surface and second inclined surface is in the range of about 70 degrees to about 100 degrees. The second inclined surface has a convex curvature when viewed from angles perpendicular thereto. The light transmissive structure is configured to receive light from a light source facing the first face in a first direction and redistribute light emerging from the second face in a second direction different from the first direction.

20 Claims, 19 Drawing Sheets

Related U.S. Application Data

(60) Provisional application No. 62/527,573, filed on Jun. 30, 2017.

(52) U.S. Cl.
CPC ........... *G02B 5/0257* (2013.01); *G02B 5/045* (2013.01); *G02B 5/0278* (2013.01)

(56) References Cited

U.S. PATENT DOCUMENTS

| | | | |
|---|---|---|---|
| 7,192,692 | B2 | 3/2007 | Wood et al. |
| 7,867,695 | B2 | 1/2011 | Freese et al. |
| 8,619,363 | B1 | 12/2013 | Coleman |
| 10,520,667 | B2 | 12/2019 | Dhar |
| 11,300,268 | B2* | 4/2022 | Purchase ............... G02B 5/0215 |
| 2001/0030805 | A1 | 10/2001 | Sawaki et al. |
| 2004/0061959 | A1 | 4/2004 | Kim |
| 2005/0122591 | A1 | 6/2005 | Parker et al. |
| 2011/0019404 | A1 | 1/2011 | Chien et al. |
| 2011/0128470 | A1 | 6/2011 | Yorita et al. |
| 2013/0044513 | A1 | 2/2013 | Pan |
| 2014/0000710 | A1 | 1/2014 | Nakahara et al. |
| 2016/0231579 | A1 | 8/2016 | Borovkov |
| 2016/0273721 | A1 | 9/2016 | Pijlman et al. |
| 2016/0320532 | A1 | 11/2016 | Purchase |
| 2017/0167679 | A1 | 6/2017 | Yui et al. |
| 2020/0025562 | A1* | 1/2020 | Saito ...................... G01B 11/26 |
| 2021/0156539 | A1 | 5/2021 | Purchase et al. |

FOREIGN PATENT DOCUMENTS

| | | |
|---|---|---|
| CN | 102007434 A | 4/2011 |
| CN | 102859272 B | 1/2014 |
| CN | 105934627 A | 9/2016 |
| CN | 106646720 A | 5/2017 |
| CN | 110998176 A | 4/2020 |
| EP | 3 645 937 A1 | 5/2020 |
| JP | 2004-524556 A | 8/2004 |
| JP | 2008-515026 A | 5/2008 |
| JP | 2012-069282 A | 4/2012 |
| JP | 2016-539463 A | 12/2016 |
| JP | 2020-526874 A | 8/2020 |
| KR | 2002-0061802 A | 7/2002 |
| KR | 10-2009-0040363 A | 4/2009 |
| KR | 10-2020-0026909 A | 3/2020 |
| WO | 2002/057816 A1 | 7/2002 |
| WO | 2015/062863 A1 | 5/2015 |
| WO | 2019/006288 A1 | 1/2019 |

OTHER PUBLICATIONS

International Preliminary Report on Patentability received for PCT Application Serial No. PCT/US2018/040268 dated Jan. 9, 2020, 8 pages.
European Extended Search Report received for EP Patent Application No. EP18824408.1 dated Feb. 24, 2021, 8 pages.
Non-Final Office Action received for U.S. Appl. No. 16/625,830 dated May 12, 2021, 26 pages.
First Office Action received for Chinese Patent Application Serial No. 201880048811.5 dated Jul. 13, 2021, 6 pages. (Including English Translation).
Communication pursuant to Article 94(3) EPC received for European Patent Application Serial No. 18824408.1 dated Nov. 17, 2021, 5 pages.
Notice of Allowance received for U.S. Appl. No. 16/625,830 dated Dec. 15, 2021, 18 pages.
Second Office Action received for Chinese Patent Application Serial No. 201880048811.5 dated Mar. 14, 2022, 10 pages. (Including English Translation).
Office Action received for Japanese Patent Application Serial No. 2019-571741, dated Jul. 12, 2022, 18 pages (9 pages of English Translation and 9 pages of Official Copy).
Office Action received for Chinese Patent Application Serial No. 201880048811.5, dated Jul. 29, 2022, 13 pages (7 pages of English Translation and 6 pages of Official Copy).
Decision on Refusal received for corresponding Japanese Patent Application No. 2019-0571741, dated Apr. 25, 2023, 6 pages including 3 pages of English Translation.
Preliminary Rejection received for corresponding Korean Patent Application No. 10-2020-7002382, dated Oct. 30, 2023, 13 pages including 7 pages of English Translation.

* cited by examiner

LIGHT TRANSMISSIVE STRUCTURES FOR REDISTRIBUTION OF LIGHT AND LIGHTING SYSTEMS INCLUDING SAME

CROSS-REFERENCE TO RELATED APPLICATIONS

The present application is a continuation of U.S. patent application Ser. No. 16/625,830, filed on Dec. 23, 2019, entitled "Light Transmissive Structures for Redistribution of Light and Lighting Systems Including Same", which is a National Stage Entry into the Unite State Patent and Trademark Office from International Patent Application No. PCT/US2018/040268, having an international filed date of Jun. 29, 2018, and which relies for priority on U.S. Provisional Application Ser. No. 62/527,573, filed on Jun. 30, 2017, entitled "Light Transmissive Structures for Redistribution of Light and Lighting Systems Including Same," the entire contents of these applications are hereby herein incorporated by reference.

FIELD

The present invention is related to light transmissive structures that may be used to redistribute light emitted from a light source and lighting systems that include such light transmissive structures.

BACKGROUND

High-efficiency LED lighting is being increasingly adopted. Typical LED light sources emit light into a Lambertian distribution with a Full Width Half Max ("FWHM") of approximately 120 degrees. LEDs, combined with elements of a luminaire (or lighting system), such as housings, reflectors and lenses can produce many light distributions, including those with a FWHM as low as 1°. Typically many cost-effective LEDs sold for general lighting are of the 120 degree Lambertian variety. Many luminaires (LED and traditional) have flat outer surfaces, such as those found in some downlights, task lights, and troffers. In many of these fixtures, a simple flat diffuser, such as a microstructured, holographic, or volumetric diffuser, is used to diffuse the LEDs to hide their appearance from viewers and smooth the surface appearance of the luminaire.

When a flat diffuser is used in a luminaire, the combination of elements in the luminaire such light sources, lenses, housings, reflectors, baffles, etc., used internally to the luminaire will result in a light distribution impinging upon the receiving face of the diffuser, herein referred to as the source distribution. Depending on the elements used, the source distribution can have wide range of FWHM values including 1°, 10°, 20°, 40°, 80°, 100°, 120°, or 140°. In some cases a wide array of 120° LEDs impinging upon the diffuser without much interference from other elements will present a source distribution near 120°. In many cases, a luminaire such as a can-style downlight or linear wall-wash luminaire may include internal sidewalls, usually reflective, that will limit the spread of the beam angle, producing a mid-width source distribution such as 60°, 85°, or 100°.

In many illumination systems, targeted areas to be illuminated are much larger than an emitting area of the light sources. Light distributions are typically measured with a method using a goniometric apparatus similar to that described in the Illuminating Engineering Society's ("IES") LM-79 standard. As described therein, luminous intensity is measured as a function of an angle from the principle axis of the light source by an optical detector. The optical detector and/or light source are/is moved relative to each other so that the optical detector measures the emitted light at the desired angles.

FIG. 1 is a polar plot illustrating a luminous intensity distribution of light emitted from a downward-facing light source, which in this example is light source with a Lambertian light distribution with a FWHM of 120 degrees. The luminous intensity is proportional to the cosine of the angle from the nadir (i.e., the downward-facing direction), which is considered to be 0° on the plot. When a flat surface such as a floor is illuminated by a Lambertian light distribution, the illuminance on the floor is greatest at nadir (directly under the fixture) and decreases monotonically for points on the floor away from the nadir. In the lighting industry, the term "Lambertian" is also frequently used to refer to light distributions with similar quality but of different widths. That is, distributions that have a peak at the nadir and monotonically decrease at higher angles are often called Lambertian. In one example, a Gaussian distribution with a FWHM of 80 degrees will often be called "Lambertian" in the lighting industry.

In lighting and other fields, it may be desirable to bend light that is emitted from the light source. In lighting applications, for example, it may be desirable to take a light distribution from a downlight with an 80-degree angle and power centered directly below the principle axis of the downlight, and shift the distribution so that the distribution has an asymmetric power distribution, i.e., power that is centered to one side of the downlight. This may be desirable to increase illumination on a target area such as a wall, a sign or a surgical patient, or to improve viewability of a display or sign from a non-perpendicular angle, among other uses. It may also be desirable to turn a light source on an angle so that the source distribution and power are centered at an angle relative to a straight downward direction (i.e., normal to a surface located directly below the light source) and then further bend the light distribution and/or provide an asymmetric distribution.

Parallel linear prisms arrayed on a flat surface such as those provided by Direction Turning Film from Luminit LLC, Torrence, CA, and Image Directing Film II from 3M Optical Systems, St. Paul, MN, may be used for this purpose. However, these known linear prism products may have an objectionable quality of light emitted in the wrong direction. For example, in a light fixture with a 120 degree Lambertian light source, it may be desirable to bend the light toward a wall to illuminate the wall. At the same time, it may be desirable to have any light remaining in the undesired direction (i.e., away from the wall) fade away smoothly and monotonically when viewing the fixture starting at zero degrees (viewing from directly underneath the light fixture) and moving away from the light approaching a 90 degree viewing angle away from the bend direction (being far from the wall and light fixture).

FIGS. 2 and 3 are polar plots that show the distribution of light in the bending plane measured using a Lambertian light source with 120° source distribution passing through a Direction Turning Film and an Image Directing Film II, respectively. The portions of the light distribution curves on the left sides of the light distribution curves (indicated with dashed ovals) illustrate how the bent light does not fade monotonically and smoothly from 0 degrees to 90 degrees away from the bend direction. FIGS. 4 and 5 are polar plots that show the distribution of light in the bending plane measured using a Lambertian light source with 80° source distribution passing through a Direction Turning Film and an Image Directing Film II, respectively. As illustrated, the light does not fade monotonically and smoothly from 0 degrees to 90 degrees away from the bend direction, as evidenced by the "bumps" on the lefts sides of the light distribution curves within the dashed ovals.

It is desirable to be able take a light distribution from a downlight having a source distribution with FWHM between 1 degree and 140 degrees and power centered directly below the principle axis of the downlight, and shift the distribution in a bend direction so that the distribution has an asymmetric power distribution with a smooth monotonic decrease in light from 0 degrees to 90 degrees away from the bend direction. It is also desirable to be able to take a light distribution from a titled downlight having a source distribution with FWHM between 1 degrees and 140 degrees and power at a tilt angle relative to an axis directly below the location of the downlight, and further shift the distribution in a bend direction such that the distribution has a symmetric or an asymmetric power distribution with a smooth monotonic decrease in light from 0 degrees to 90 degrees away from the bend direction.

SUMMARY

According to an aspect of the embodiments of the invention, there is provided light transmissive structure that includes a light transmissive substrate having first and second opposing faces, and an array of microprism elements on the first face. Each microprism element includes a first inclined surface disposed at a first inclined angle relative to the second face, and a second inclined surface disposed at a second inclined angle relative to the second face. The first inclined angle is less than the second inclined angle, and a peak angle between the first inclined surface and second inclined surface is in the range of about 70 degrees to about 100 degrees. The second inclined surface has a convex curvature when viewed from angles perpendicular thereto. The light transmissive structure is configured to receive light emitted from a light source facing the first face in a first direction and redistribute light emerging from the second face in a second direction different from the first direction.

In an embodiment, the light emitted from the second face has an asymmetric distribution.

In an embodiment, the first inclined angle is in the range of about 10 degrees to about 40 degrees.

In an embodiment, the second inclined angle is in the range of about 40 degrees to about 100 degrees.

In an embodiment, each of the microprism elements has a length of about 100 pm and a width of about 40 μm.

In an embodiment, the microprism elements are arrayed on the light transmissive substrate in a grid along perpendicular rows and columns.

In an embodiment, the microprism elements alternate positions by one-half a period in each row.

In an embodiment, the first inclined surface is substantially planar.

In an embodiment, the light transmissive structure includes a rippled pattern across the array of microprism elements, the rippled pattern having a plurality of peaks and a plurality of valleys. In an embodiment, the rippled pattern has a 20 μm period in a third direction and a 60 μm period in a fourth direction orthogonal to the third direction.

In an embodiment, at least some of the microprism elements are curved and nested to approximately fill a hexagonal shape. In an embodiment, the hexagonal shape is approximately 270 μm in size.

In an embodiment, the light transmissive structure includes a plurality of hexagonal shapes comprising the curved and nested microprism elements.

According to an aspect of the invention, there is provided a lighting system that includes a light source, and a light transmissive structure spaced from the light source. The light transmissive structure includes a light transmissive substrate having a first face facing the light source and a second face on an opposite side of the light transmissive substrate as the first face, and an array of microprism elements on the first face. Each microprism element includes a first inclined surface disposed at a first inclined angle relative to the second face, and a second inclined surface disposed at a second inclined angle relative to the second face. The first inclined angle is less than the second inclined angle, and a peak angle between the first inclined surface and second inclined surface is in the range of about 70 degrees to about 100 degrees. The second inclined surface has a convex curvature when viewed from angles perpendicular thereto. The light transmissive structure is configured receive light emitted from the light source in a first direction and redistribute light emerging from the second face in a second direction different from the first direction.

In an embodiment, the light source has a Full Width Half Max light distribution of between 10 degrees and 120 degrees.

In an embodiment, the light source and the light transmissive structure are oriented so that a principal axis of the light emitted from the light source is incident on the first face of the light transmissive structure at an angle between normal and about 45 degrees from normal.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following figures are illustrated to emphasize the general principles of the present disclosure and are not necessarily drawn to scale, although at least one of the figures may be drawn to scale. Reference characters designating corresponding components are repeated as necessary throughout the figures for the sake of consistency and clarity.

DETAILED DESCRIPTION

Figure 1:
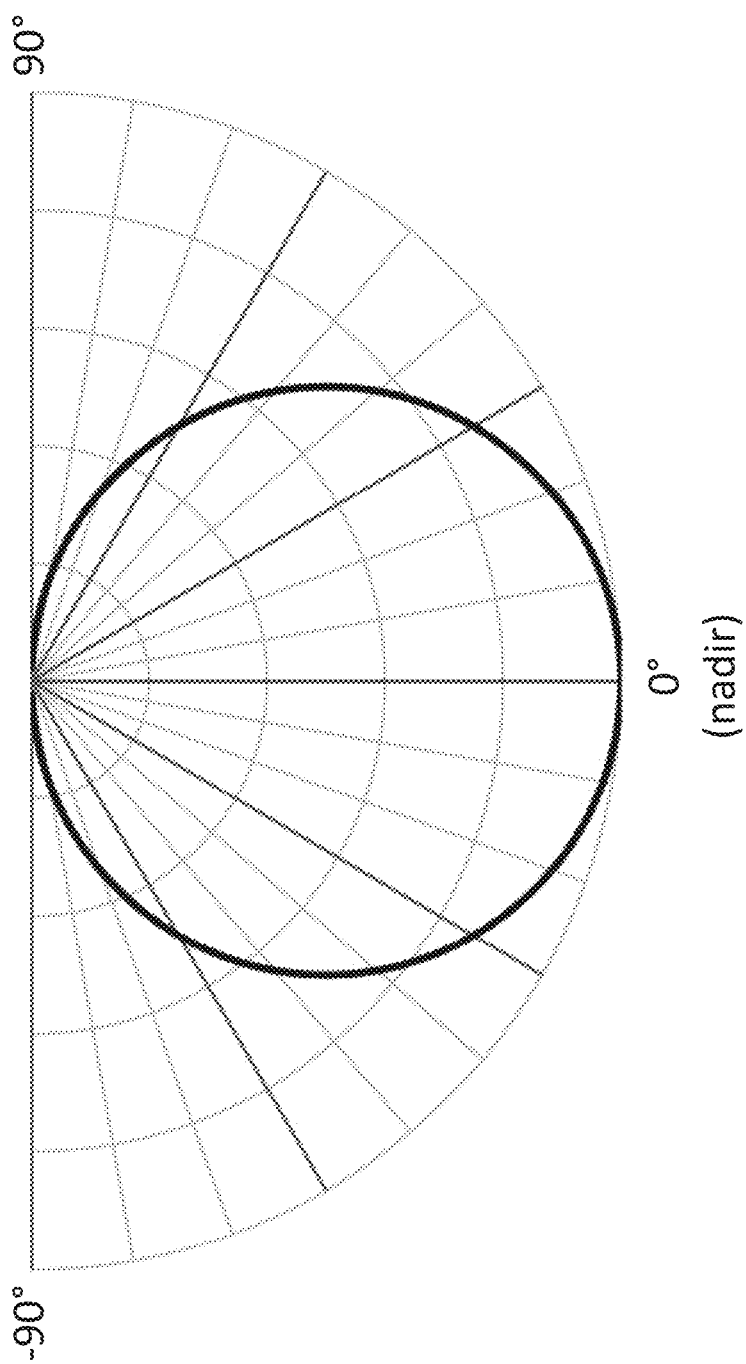
FIG. 1 is a polar plot illustrating a luminous intensity distribution of light emitted from a downward-facing light source having a Lambertian light distribution with a Full Width Half Maximum ("FWHM") of 120 degrees.
Figure 2:
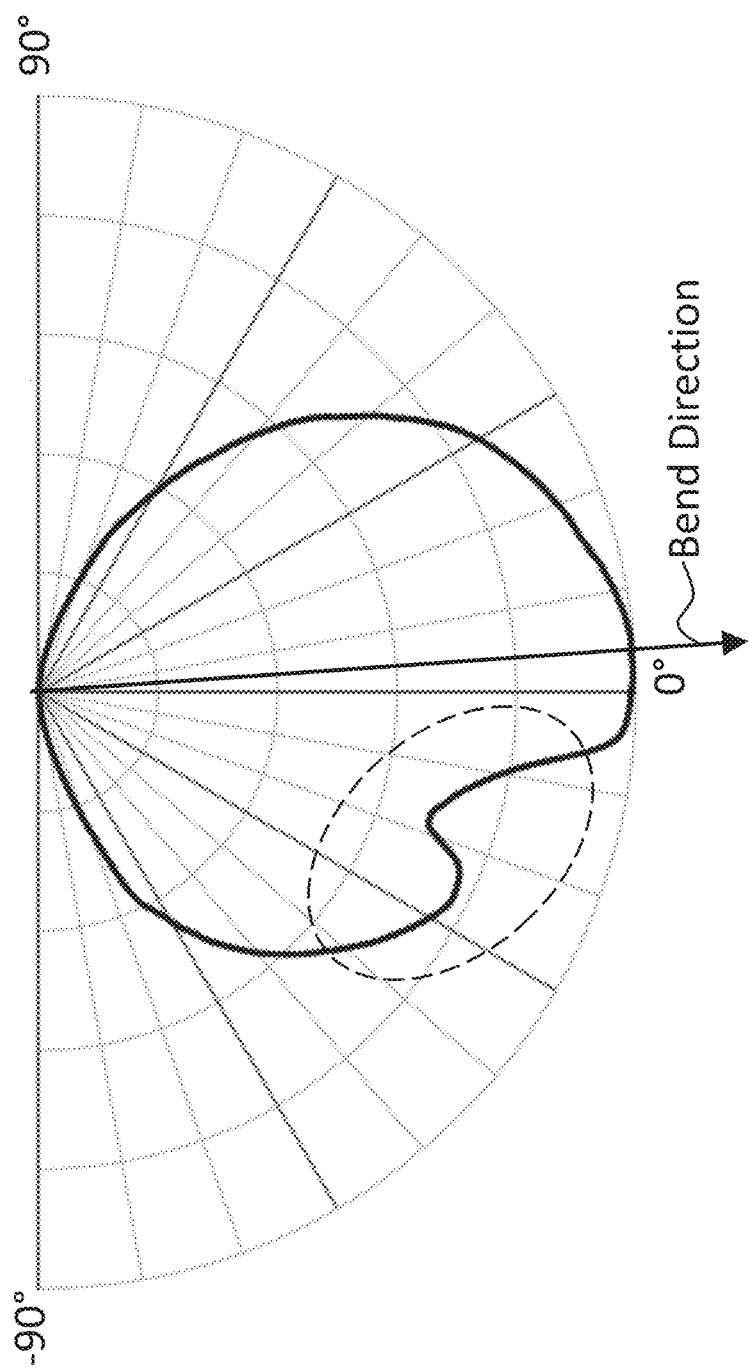
FIG. 2 is a polar plot illustrating the luminous intensity source distribution of FIG. 1 after passing through a Luminit Direction Turning Film.
Figure 3:
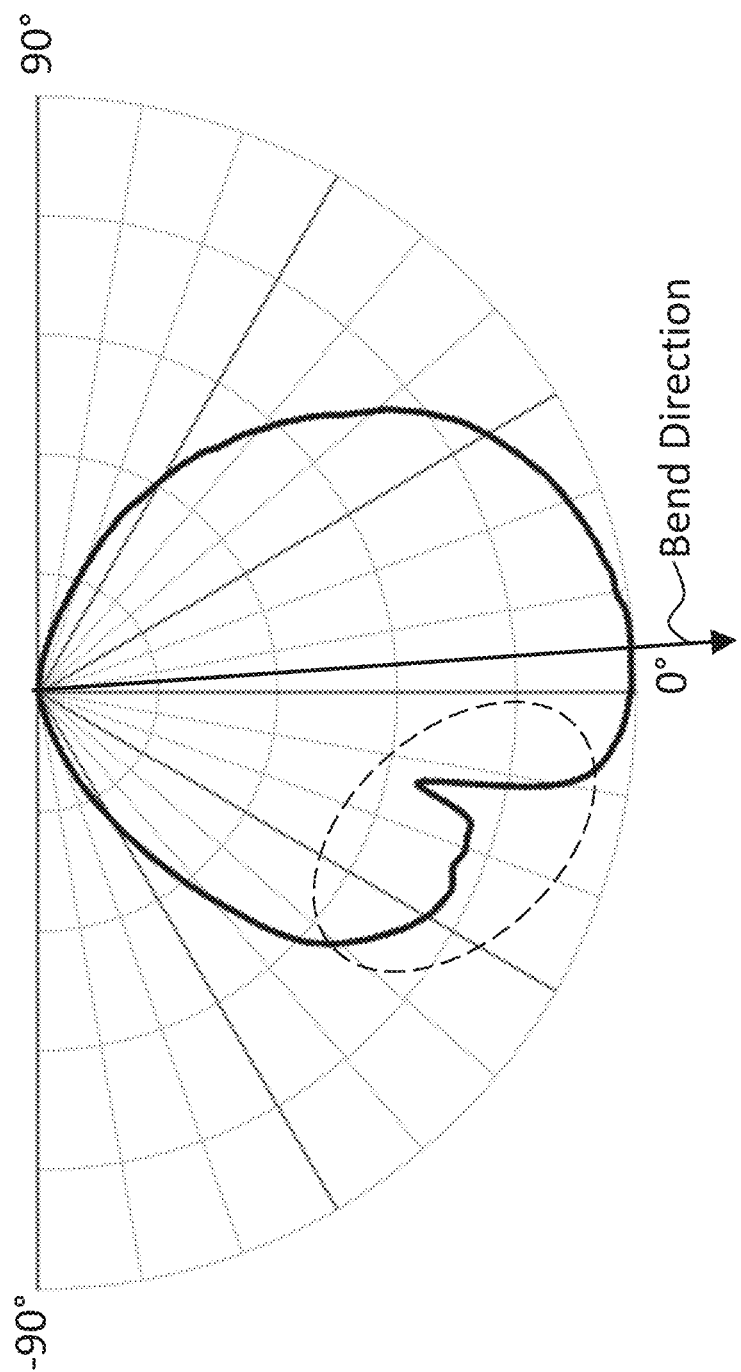
FIG. 3 is a polar plot illustrating the luminous intensity source distribution of FIG. 1 after passing through a 3M Image Directing Film.
Figure 4:
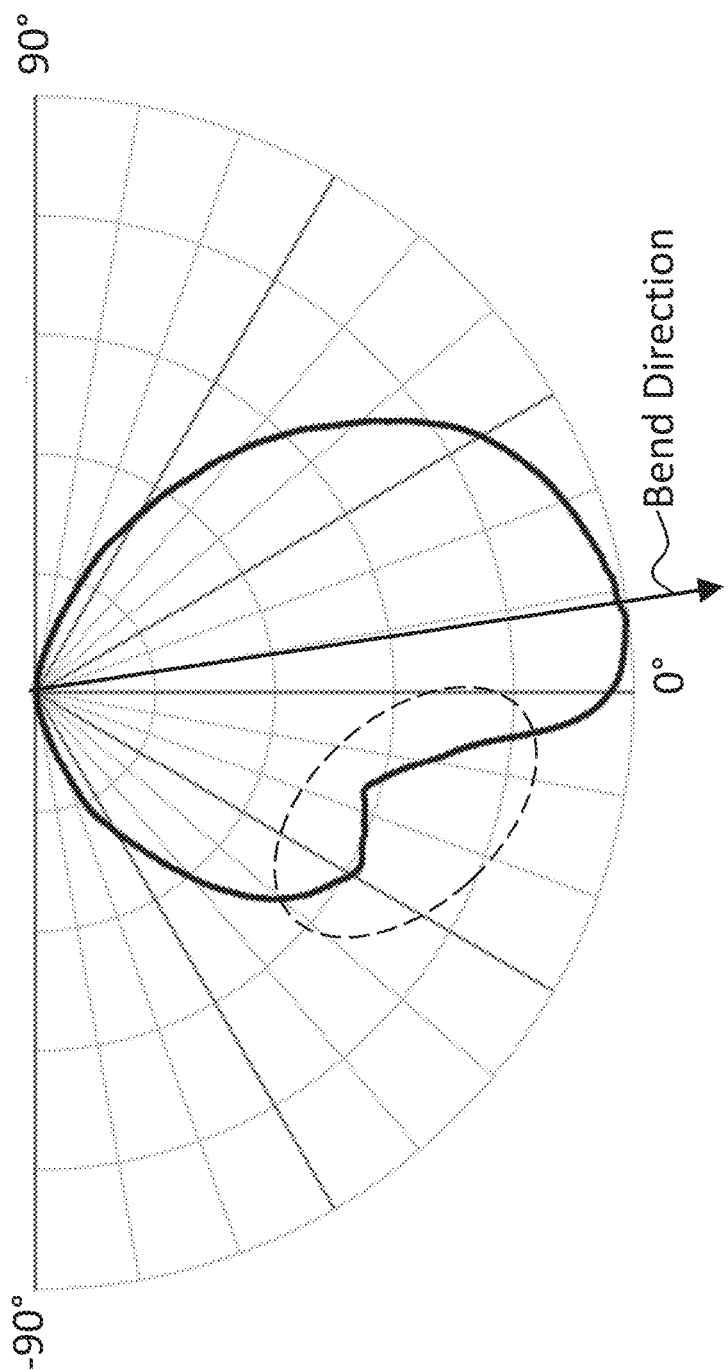
FIG. 4 is a polar plot illustrating a luminous intensity distribution of light emitted from a downward-facing light source with a 80 degree FWHM source distribution after passing through a Luminit Direction Turning Film.
Figure 5:
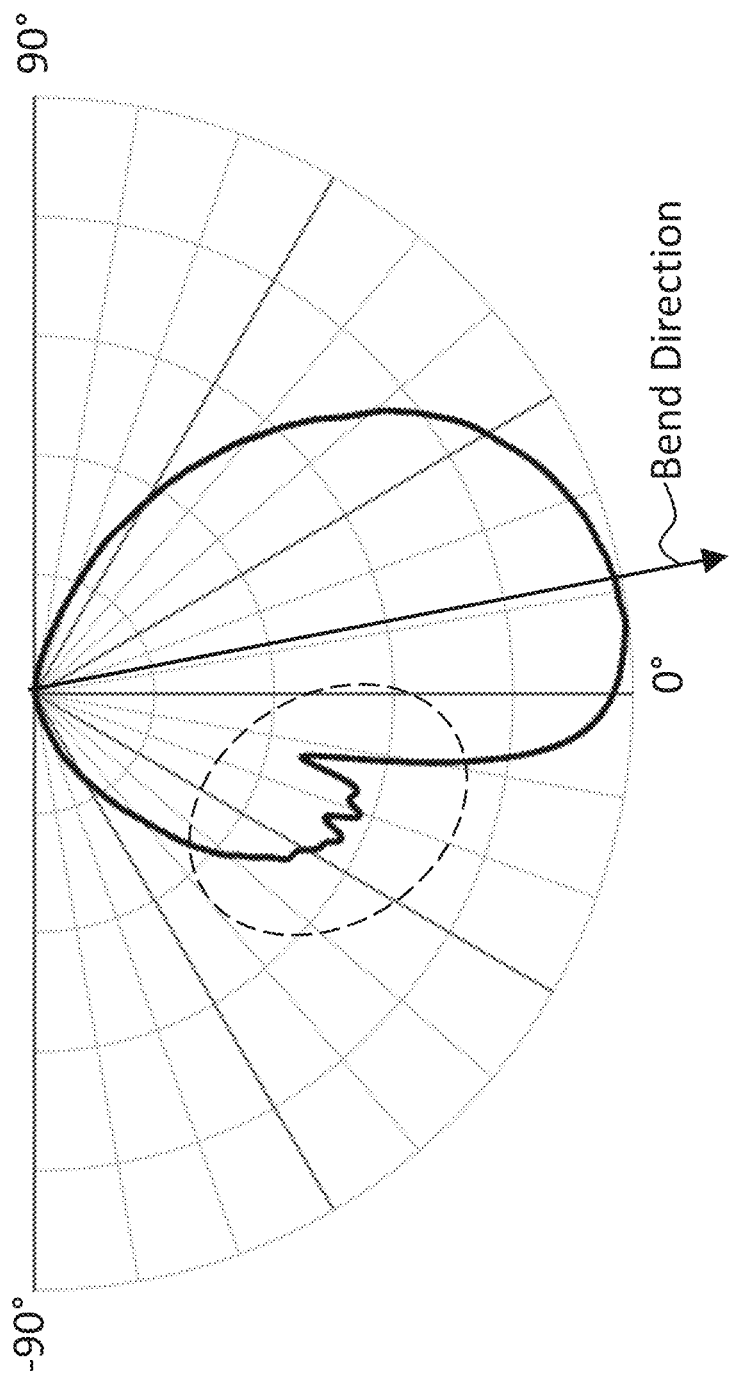
FIG. 5 is a polar plot illustrating a luminous intensity distribution of light emitted from a downward-facing light source with a 80 degree FWHM source distribution after passing through a 3M Image Directing Film.
Figure 6:
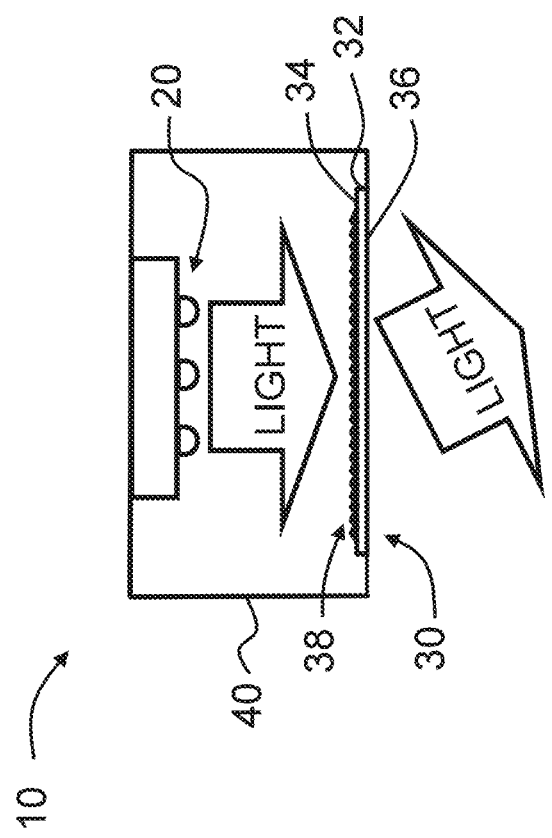
FIG. 6 schematically illustrates a lighting system having a light source and a light transmissive structure in accordance with embodiments of the invention.

FIG. 6 schematically illustrates a lighting system 10 in accordance with embodiments of the invention. As illustrated, the lighting system 10 includes a light source 20 and a diffuser or light transmissive structure 30 that is spaced from the light source 20. The light source 20 may be any suitable light source, such as an LED or a plurality of LEDs. The light transmissive structure 30 includes a light transmissive substrate 32 that has a first face 34 and a second face 36 that is opposite the first face 34. A plurality of microprism elements (or microprisms) 38 are on the first face 32. Further details of embodiments of the microprisms 38 are described below.

The light transmissive structure 30 may be suspended under the light source 20 via any techniques known in the art, such as using cables, a frame at sides or edges, or an enclosure, such as a housing. As illustrated, the light source 20 and the light transmissive structure 30 are mounted to a housing 40. Although a single housing 40 is illustrated, it is contemplated that the light source 20 and/or the light transmissive structure 30 may be mounted in a sub-housing that is mounted to the housing 40. The housing 40 may consist of one or more brackets configured to hold the light source 20 and the light transmissive structure 30 at the desired spacing and orientation to each other so that the light source 20 will emit light such that the greatest intensity of the light will be incident on the first face 34 of the light transmissive substrate 32 at the desired angle. As described in further detail below, the light transmissive structure 30 is configured to "bend" the light so that the light exiting the second face 36 has a different principal axis than that of the light emitted from the light source 20.

Figure 7:
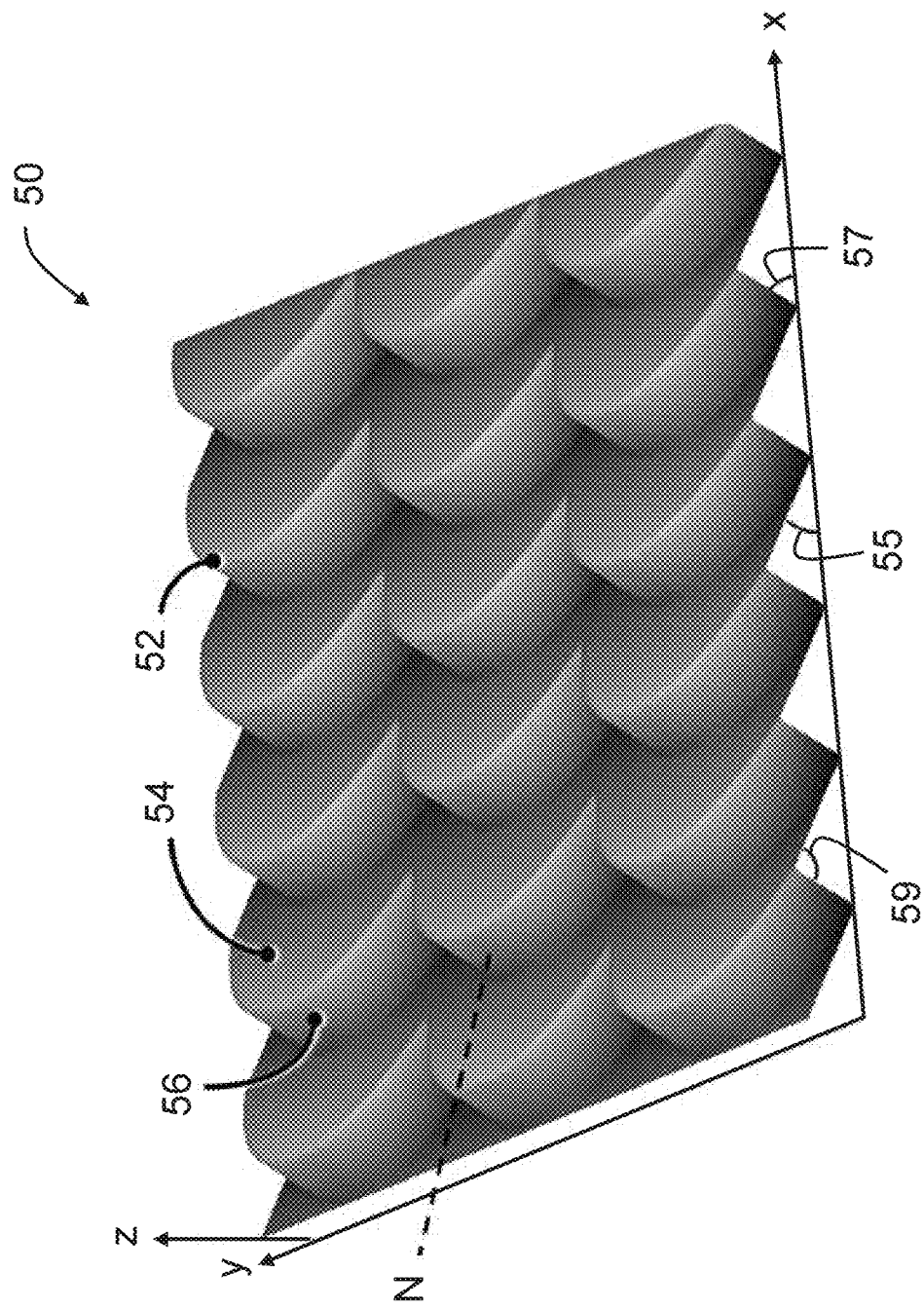
FIG. 7 illustrates a plurality of microprisms as part of the light transmissive structure of FIG. 6 in accordance with an embodiment of the invention.

FIG. 7 illustrates an embodiment of an array 50 of microprisms 52 of the light transmissive structure 30 of FIG. 6. As illustrated, each microprism 52 includes a first surface 54 that is substantially planar and has an inclination angle 55 of approximately 40 degrees, and a second surface 56 having an inclination angle 57 of approximately 70 degrees. A peak angle 59 between the first surface 54 and the second surface 56 is approximately 70 degrees. The second surface 56 has an inclination angle 57 greater than that of the first surface 54, and a curvature that is convex when viewed from outside of the light transmissive structure 30 in a direction N that is normal thereto. In the embodiment illustrated in FIG. 7, each microprism 52 may be approximately 100 µm (along the y axis) by 40 µm (along the x axis) in size, and a plurality of the microprisms 52 arrayed on the substrate 32 along perpendicular rows and columns. It should be understood that these dimensions are intended to be provided as an example only and the microprisms 52 may be larger or smaller in size. Also, the inclination angles 55, 57 and the peak angle 59 may be larger or smaller. For example, the inclination angle 55 of the first surface 54 may be in the range of about 10 degrees to about 40 degrees, the inclination angle 57 of the second surface 56 may be in the range of about 40 degrees to about 100 degrees, and the peak angle 59 may be in the range of about 70 degrees to about 100 degrees.

Figure 8:
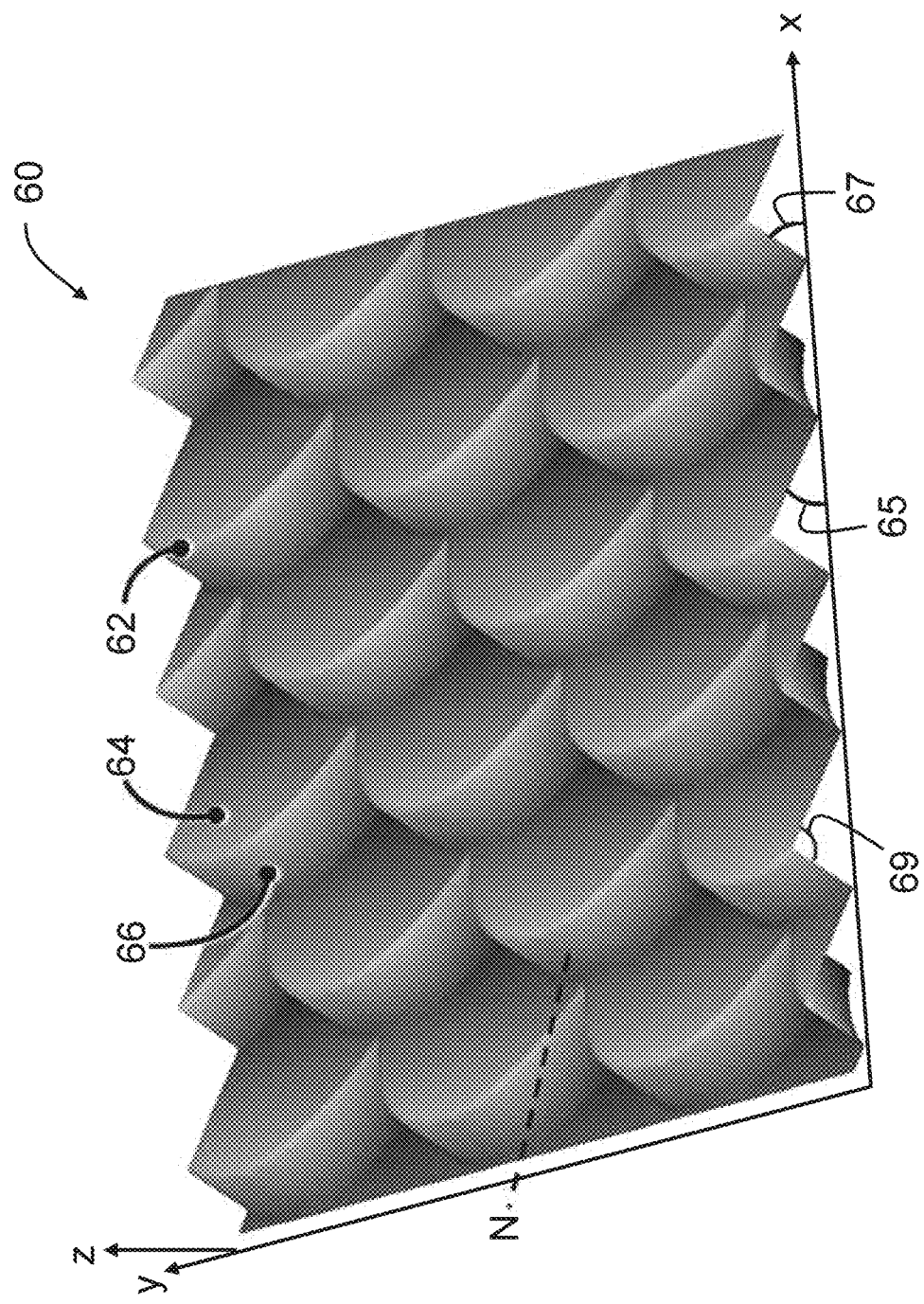
FIG. 8 illustrates a plurality of microprisms as part of the light transmissive structure of FIG. 6 in accordance with an embodiment of the invention.

FIG. 8 illustrates an embodiment of an array 60 of microprisms 62 of the light transmissive structure 30 of FIG. 6. As illustrated, each microprism 62 includes a first surface 64 that is substantially planar and has an inclination angle 65 of approximately 40 degrees, and a second surface 66 having an inclination angle 67 of approximately 70 degrees. A peak angle 69 between the first surface 64 and the second surface 66 is approximately 70 degrees. The second surface 66 has an inclination angle 67 greater than that of the first surface 64, and a curvature that is convex when viewed from outside of the light transmissive structure 30 in a direction N that is normal thereto. In the embodiment illustrated in FIG. 8, each microprism 62 may be approximately 100 µm (along the y axis) by 40 µm (along the x axis) in size, and a plurality of microprisms 62 arrayed on the substrate 32 along perpendicular rows and columns in which the microprisms 62 alternate position by half a period in each row, as illustrated. It should be understood that these dimensions are intended to be provided as an example only and the microprisms 62 may be larger or smaller in size. Also, the inclination angles 65, 67 and the peak angle 69 may be larger or smaller. For example, the inclination angle 65 of the first surface 64 may be in the range of about 10 degrees to about 40 degrees, the inclination angle 67 of the second surface 66 may be in the range of about 40 degrees to about 100 degrees, and the peak angle 69 may be in the range of about 70 degrees to about 100 degrees.

Figure 9:
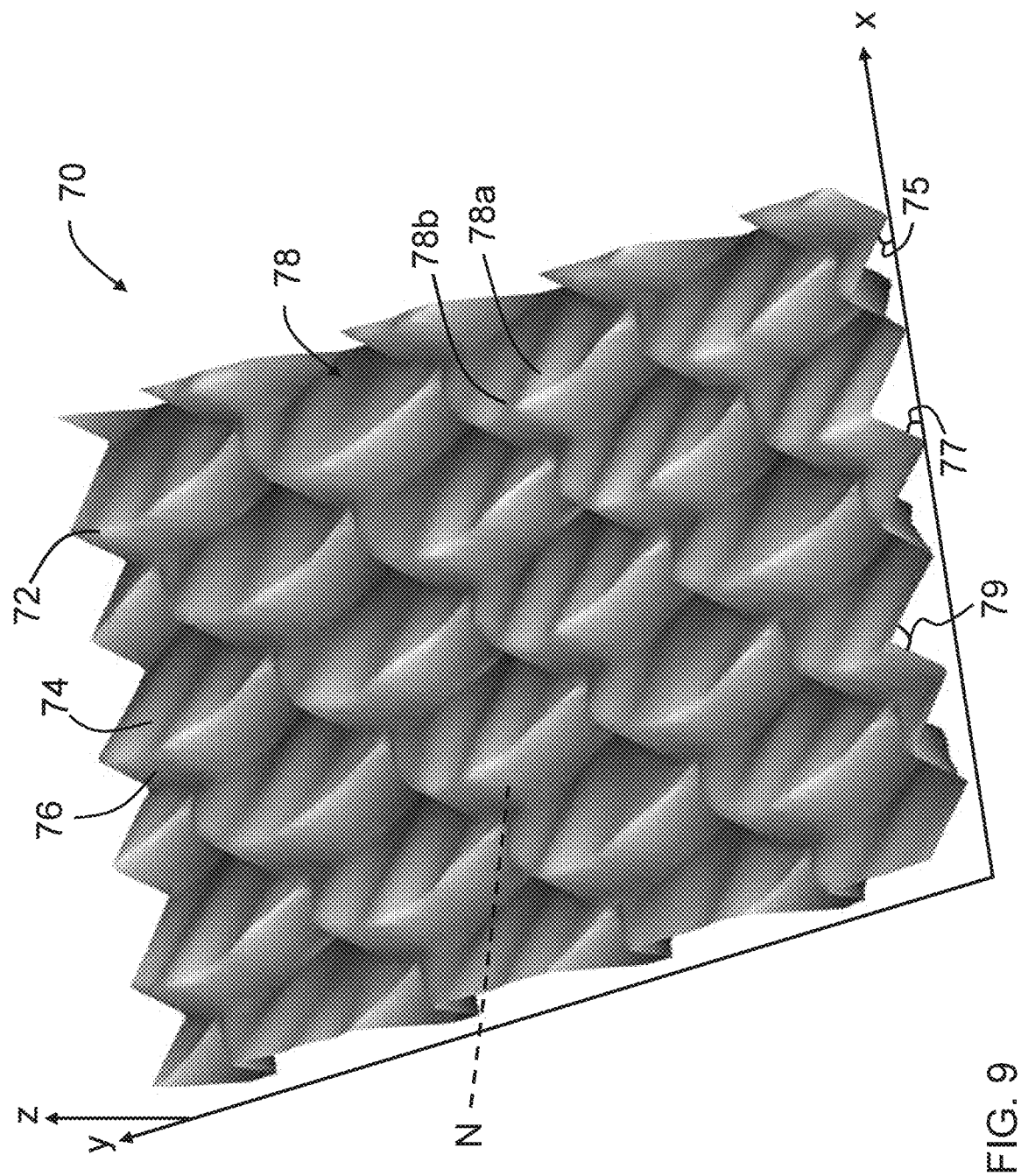
FIG. 9 illustrates a plurality of microprisms as part of the light transmissive structure of FIG. 6 in accordance with an embodiment of the invention.

FIG. 9 illustrates an embodiment of an array 70 of microprisms 72 of the light transmissive structure 30 of FIG. 6. As illustrated, each microprism 72 includes a first surface 74 having an inclination angle 75 of approximately 40 degrees, and a second surface 76 having an inclination angle 77 of approximately 70 degrees. A peak angle 79 between the first surface 74 and the second surface 76 is approximately 70 degrees. The second surface 76 has an inclination angle 77 greater than that of the first surface 74, and a curvature that is convex when viewed from outside of the light transmissive structure 30 in a direction N that is normal thereto. In the embodiment illustrated in FIG. 9, each microprism 72 may be approximately 100 μm (along the y axis) by 40 μm (along the x axis) in size, and a plurality of microprisms 72 arrayed on the substrate 32 along perpendicular rows and columns in which the microprisms 72 alternate position by half a period in each row, as illustrated. It should be understood that these dimensions are intended to be provided as an example only and the microprisms 72 may be larger or smaller in size. Also, the inclination angles 75, 77 and the peak angle 79 may be larger or smaller. For example, the inclination angle 75 of the first surface 74 may be in the range of about 10 degrees to about 40 degrees, the inclination angle 77 of the second surface 76 may be in the range of about 40 degrees to about 100 degrees, and the peak angle 79 may be in the range of about 70 degrees to about 100 degrees.

As also illustrated in FIG. 9, the array of microprisms 70 includes a rippled pattern 78 that includes a plurality of peaks 78a and a plurality of valleys 78b. The rippled pattern 78 may have about a 20 μm period in a direction parallel to the y axis and about a 60 μm period in a direction parallel to the x axis. The illustrated embodiment should not be considered to be limiting in any way and different rippled or textured patterns having different sizes may be used in accordance with embodiments of the invention.

Figure 10:
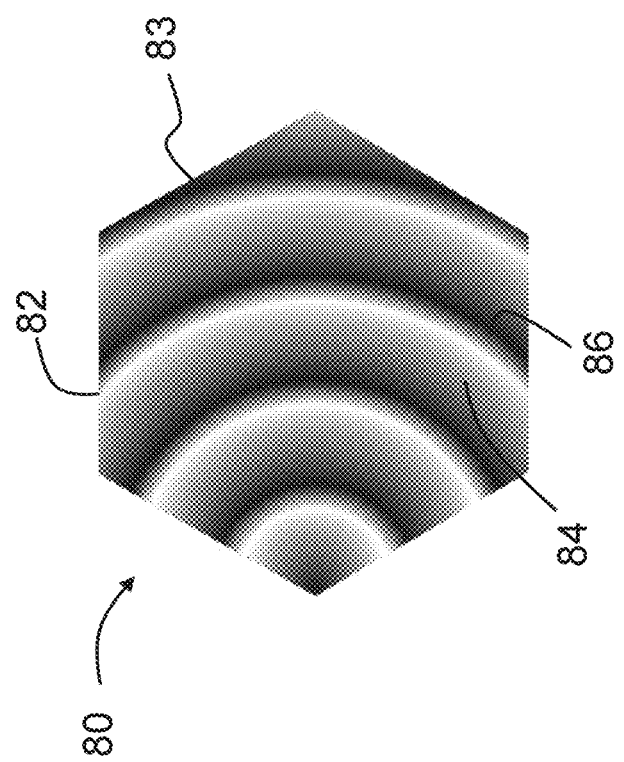
FIG. 10 illustrates a plurality of microprisms as part of the light transmissive structure of FIG. 6 in accordance with an embodiment of the invention.
Figure 11:
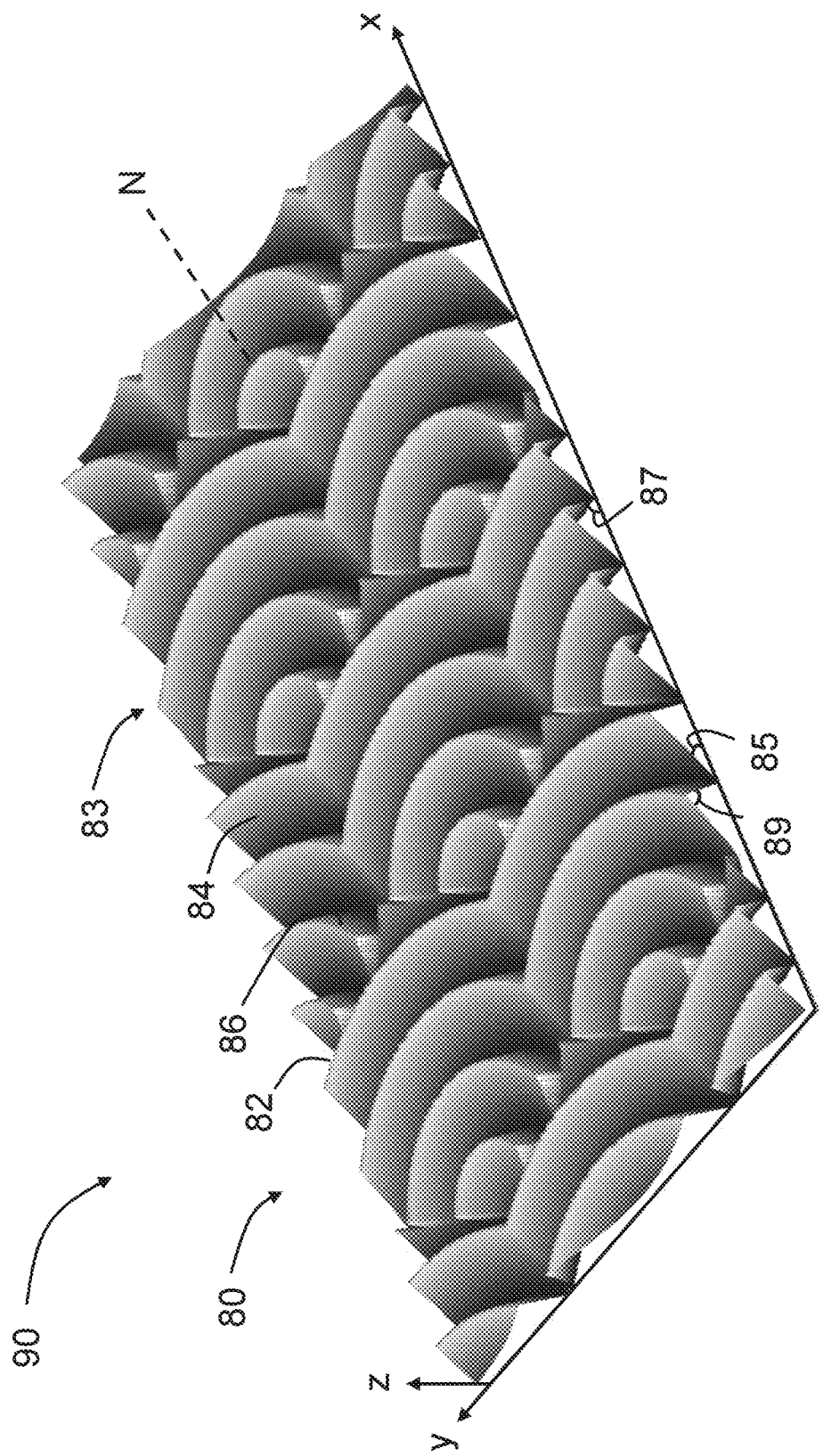
FIG. 11 illustrates the microprisms of FIG. 10 in a repeating pattern.

FIG. 10 illustrates an overhead view of an embodiment of an array 80 of microprisms 82 of the light transmissive structure 30, and FIG. 11 illustrates the array 80 of microprisms 82 in a repeating pattern 90. As illustrated, whiter colors represent higher points on the surfaces of the microprisms 82 and darker colors represent lower points on the surfaces of the microprisms 82. The microprisms 82 are curved, of different sizes, and nested to approximately fill a hexagonal shape 83. Each of the microprisms 82 has a first surface 84 disposed at an inclination angle 85 of approximately 40 degrees and a second surface 86 disposed at an inclination angle 87 of approximately 70 degrees. A peak angle 89 between the first surface 84 and the second surface 86 is approximately 70 degrees. The second surface 86 has an inclination angle 87 greater than that of the first surface 84, and a curvature that is convex when viewed from outside the light transmissive structure 30 in a direction N that is normal thereto. The hexagonal shape 83 may be approximately 270 μm in size (flat side-to-flat side) and repeated over the surface of the substrate 32 as partially depicted in FIG. 10. It should be understood that this dimension is intended to be provided as an example only and the hexagonal shape 83 may be larger or smaller in size. In other embodiments, the nested curved microprisms 82 may be arranged to fill shapes other than a hexagon 83. For example, in other embodiments, the nested curved microprisms 82 may be arranged to fill a square, a rhombus, or any other desired shape than may be replicated in a repeating pattern.

The light transmissive structures according to any of the embodiments described herein may be created using many techniques known in the art. For example, in an embodiment, the shape of the prisms may be cast onto a substrate using a suitable master mold, and a thermally-curing polymer or an ultraviolet (UV) light curing polymer, or the shape may be impressed into a thermoplastic substrate through compression molding or other molding, or may be created at the same time as the substrate using extrusion-embossing or injection molding. The microprisms may be produced by replicating a master. For example, an optical diffuser may be made by replication of a master containing the desired shapes as described in U.S. Pat. No. 7,190,387 B2 to Rinehart et al., entitled "Systems And Methods for Fabricating Optical Microstructures Using a Cylindrical Platform and a Rastered Radiation Beam"; U.S. Pat. No. 7,867,695 B2 to Freese et al., entitled "Methods for Mastering Microstructures Through a Substrate Using Negative Photoresist"; and/or U.S. Pat. No. 7,192,692 B2 to Wood et al., entitled "Methods for Fabricating Microstructures by Imaging a Radiation Sensitive Layer Sandwiched Between Outer Layers", assigned to the assignee of the present invention, the disclosures of all of which are incorporated herein by reference in their entireties as if set forth fully herein. The masters themselves may be fabricated using laser scanning techniques described in these patents, and may also be replicated to provide diffusers using replicating techniques described in these patents.

In an embodiment, laser holography, known in the art, may be used to create a holographic pattern that creates the desired microprisms in a photosensitive material. In an embodiment, projection or contact photolithography, such as used in semiconductor, display, circuit board, and other common technologies known in the art, may be used to expose the microprisms into a photosensitive material. In an embodiment, laser ablation, either using a mask or using a focused and modulated laser beam, may be used to create the microprisms including the indicia in a material. In an embodiment, micromachining (also known as diamond machining), known in the art, may be used to create the desired microprisms from a solid material. In an embodiment, additive manufacturing (also known as 3D printing), known in the art, may be used to create the desired microprism in a solid material.

Figure 12:
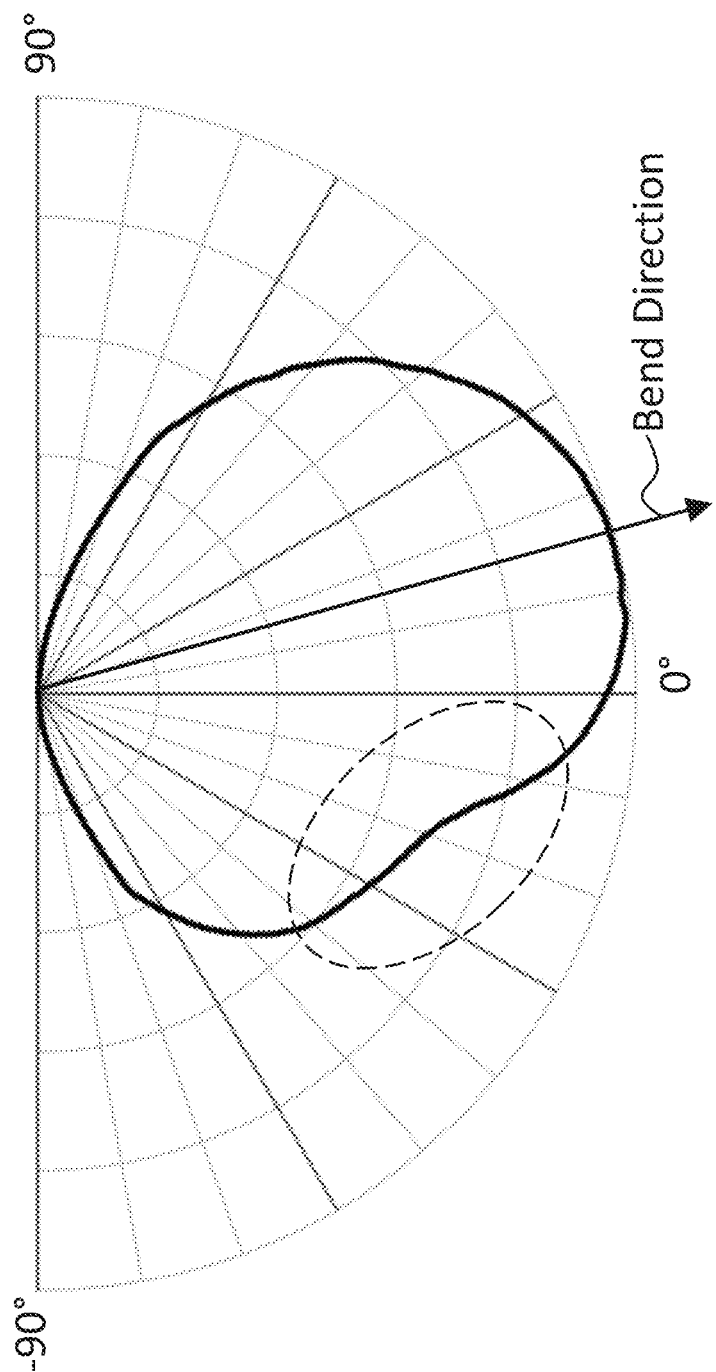
FIG. 12 is a polar plot illustrating a luminous intensity distribution of light emitted from a downward-facing light source with a 120 degree FWHM Lambertian source distribution after passing through a light transmissive structure having the microprisms of FIG. 8.

FIG. 12 illustrates the distribution of light in the bending plane measured using a Lambertian light source with 120 degree FWHM source distribution passing through the light transmissive structure 30 having the array 60 of microprisms 62 illustrated in FIG. 8. FIG. 12 shows a smooth monotonic decrease in light from 0 degrees to 90 degrees away from the bend direction. In addition, the light transmissive structure 30 appears to provide stronger or increased bending of the light, as compared to the films of the prior art described above.

Figure 13:
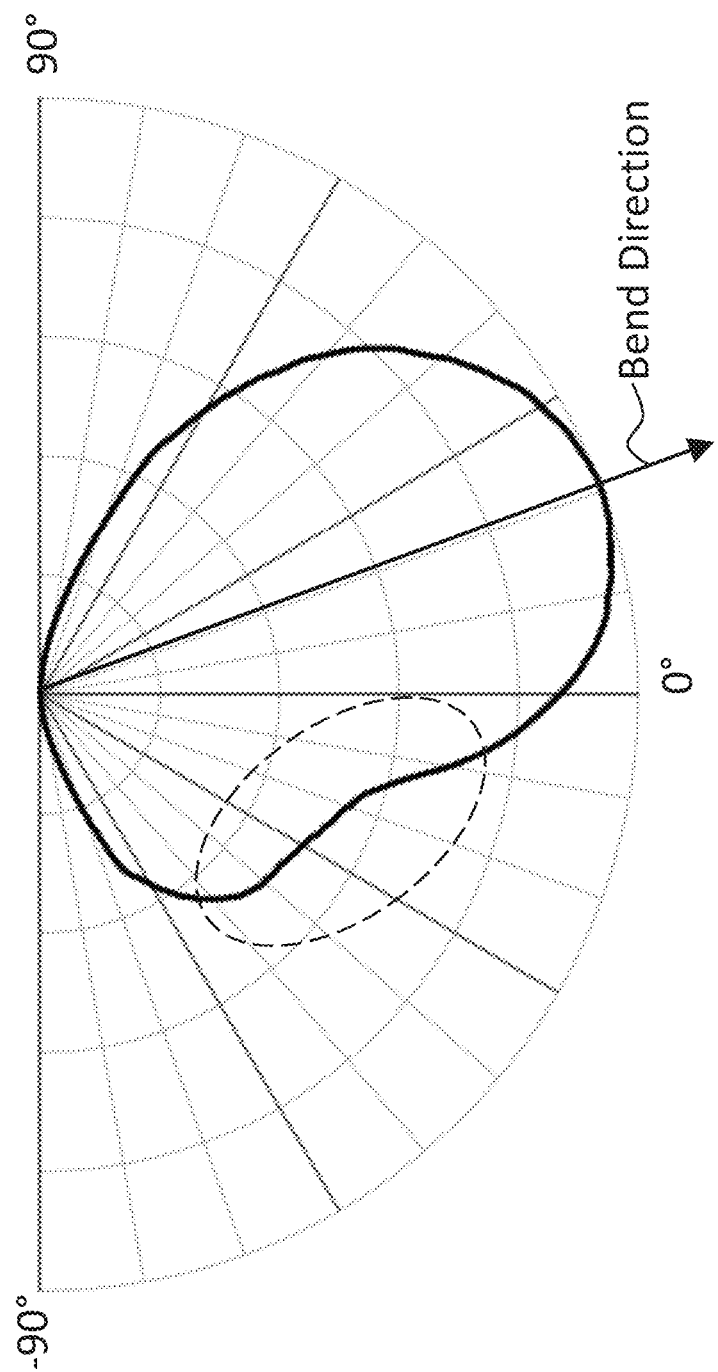
FIG. 13 is a polar plot illustrating a luminous intensity distribution of light emitted from a downward-facing light source with a 80 degree FWHM source distribution after passing through the light transmissive structure having the microprisms of FIG. 8.

FIG. 13 illustrates the distribution of light in the bending plane measured using a light source with 80 degree FWHM source distribution passing through the light transmissive structure 30 having the array 60 of microprisms 62 illustrated in FIG. 8. FIG. 13 shows a monotonic decrease in light from 0 degrees to 90 degrees away from the bend direction. In addition, the light transmissive structure 30 appears to provide stronger or increased bending of the light, as compared to the films of the prior art described above.

Figure 14:
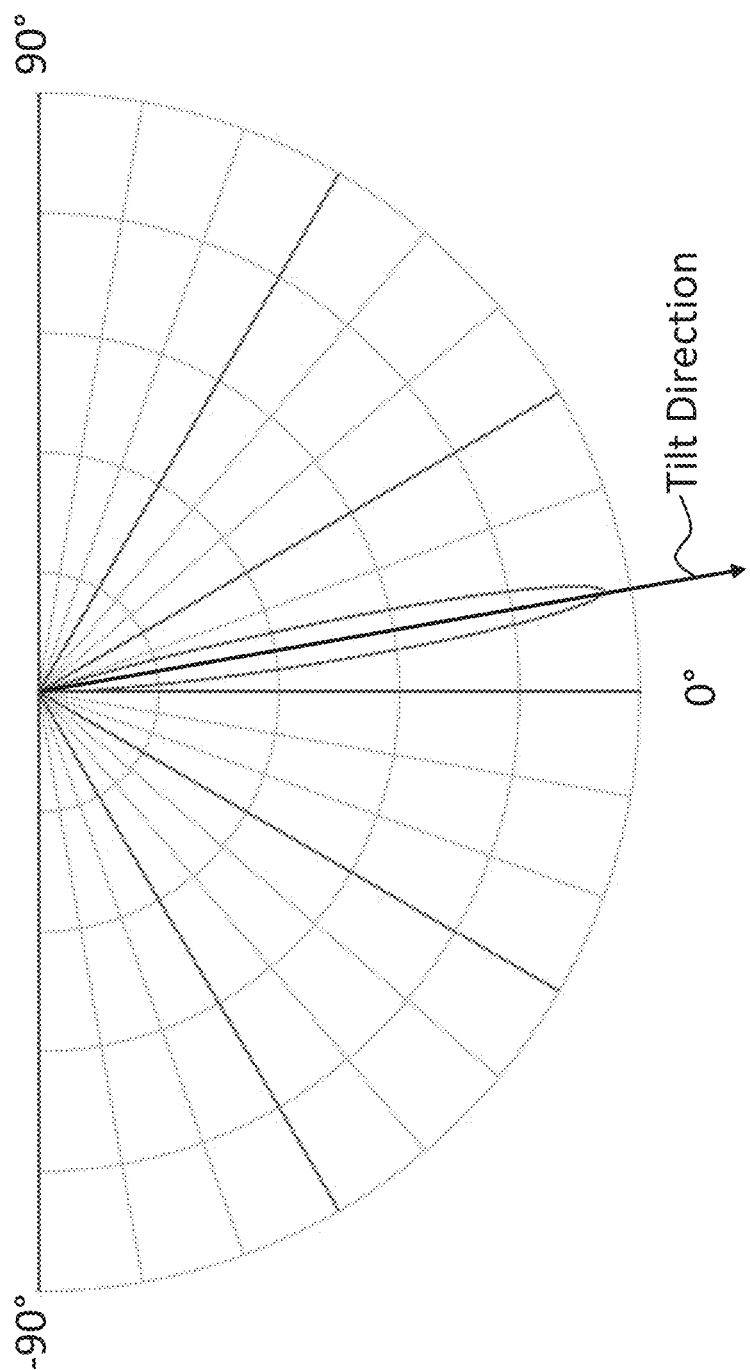
FIG. 14 is a polar plot illustrating a source distribution of light emitted from a light source with a 10 degree FWHM that has been tilted by 10 degrees.

FIG. 14 illustrates a source distribution of light emitted from a light source with a 10 degree FWHM that has been tilted by 10 degrees relative to a direction (corresponding to 0°) extending directly downward from the light source. As illustrated, the distribution is generally symmetric relative to the tilt direction.

Figure 15:
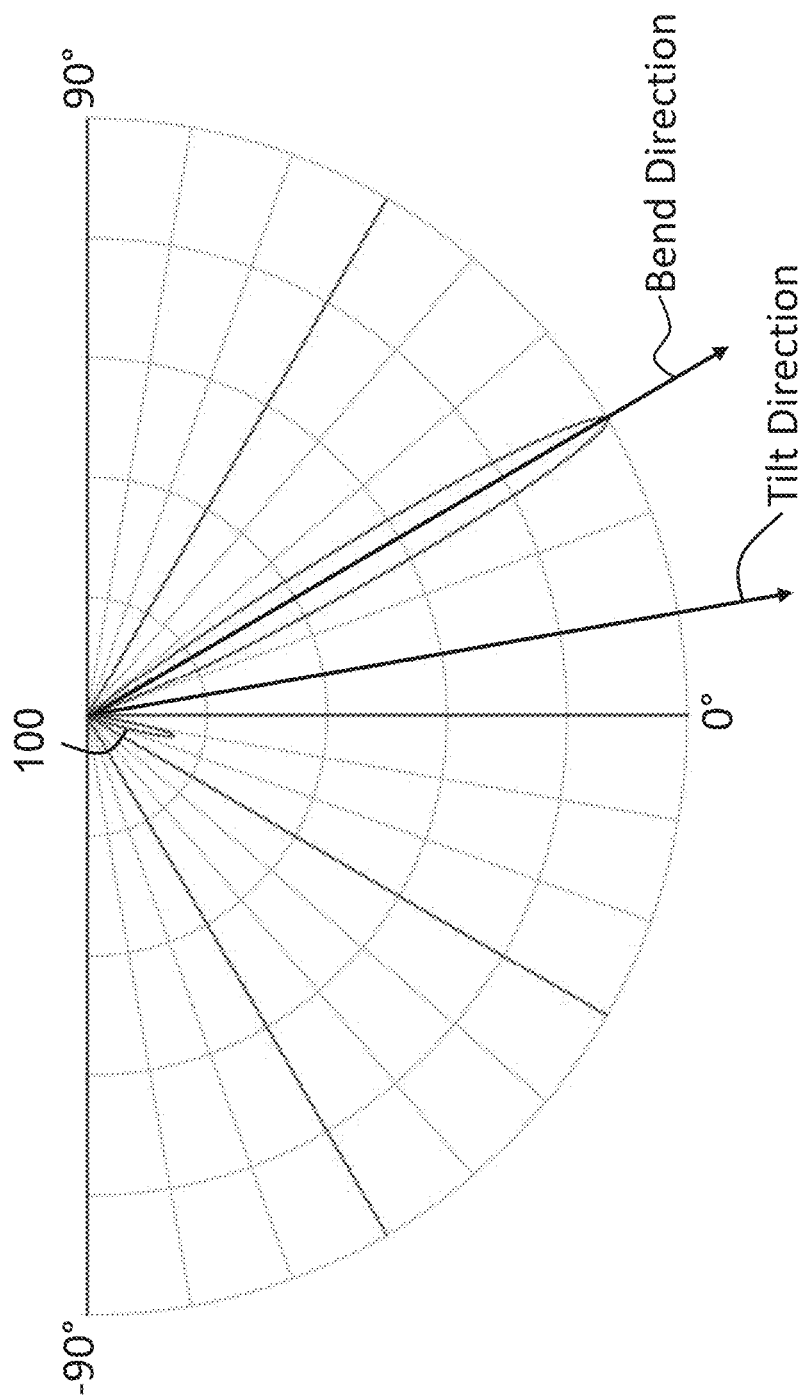
FIG. 15 is a polar plot of the source distribution of FIG. 14 after passing through a Luminit Direction Turning Film.

FIG. 15 illustrates the light distribution in the bending plane after the source distribution of FIG. 14 passes through a Luminit Direction Turning Film. As illustrated, the Luminit Direction Turning Film generally redistributed the light in a bend direction that is approximately +20° from the tilt direction, but also created an undesired secondary distribution 100 generally directed at an angle of about −20° from the tilt direction.

Figure 16:
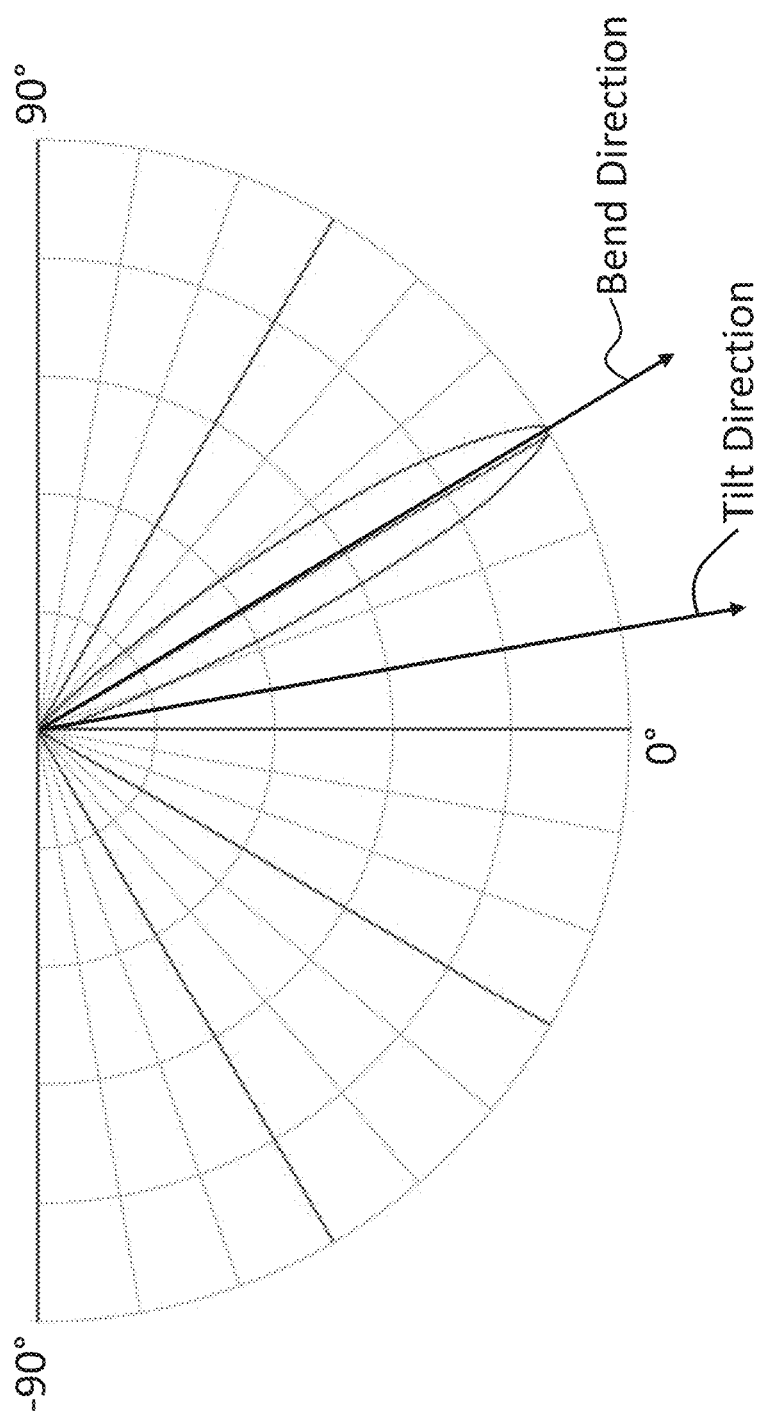
FIG. 16 is a polar plot of the source distribution of FIG. 14 after passing through a light transmissive structure having the microprisms of FIG. 8.

FIG. 16 illustrates the light distribution in the bending plane after the source distribution of FIG. 14 passes through a light transmissive structure 30 having the array 60 of microprisms 62 of FIG. 8. As illustrated, the light transmissive structure 30 redistributed the light in a bend direction that is approximately +20° from the tilt direction and did not create any secondary distributions.

Figure 17:
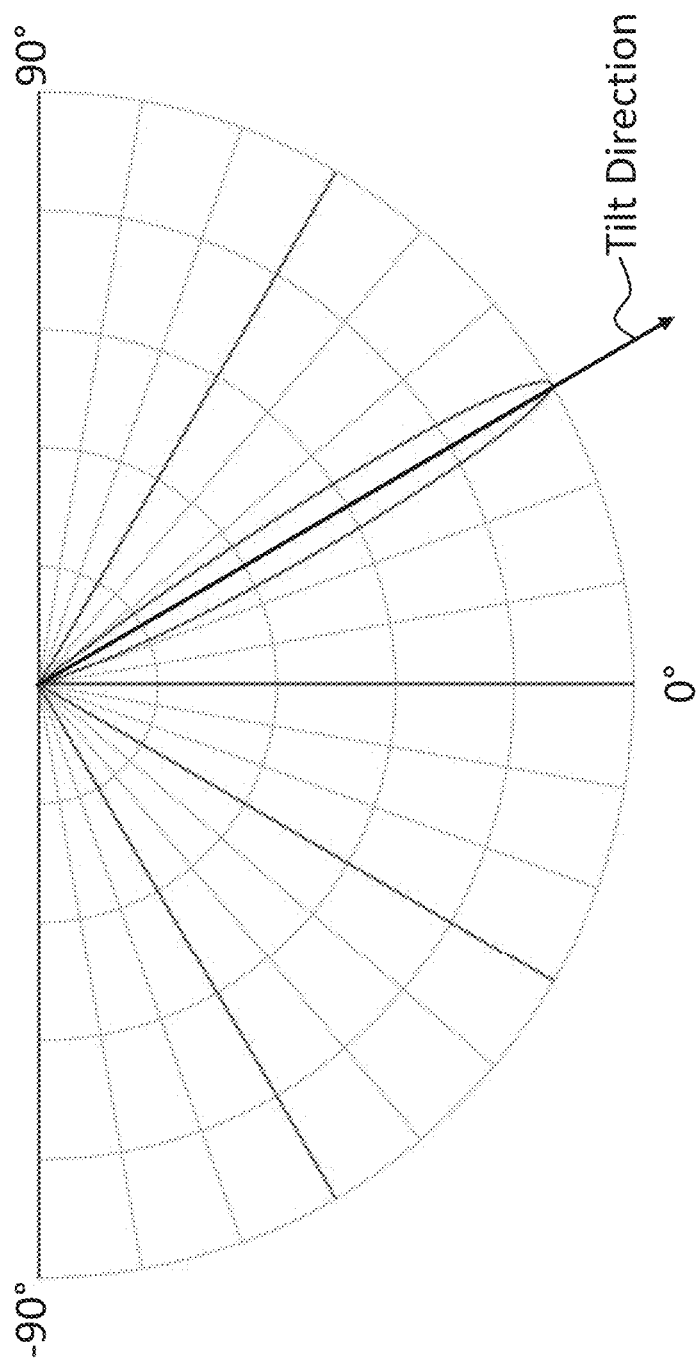
FIG. 17 is a polar plot illustrating a source distribution of light emitted from a light source with a 10 degree FWHM that has been tilted by 30 degrees.

FIG. 17 illustrates the source distribution of light emitted from a light source with a 10 degree FWHM that has been tilted by 30 degrees relative to a direction (corresponding to 0°) extending directly downward from the light source. As illustrated, the distribution is generally symmetric relative to the tilt direction.

Figure 18:
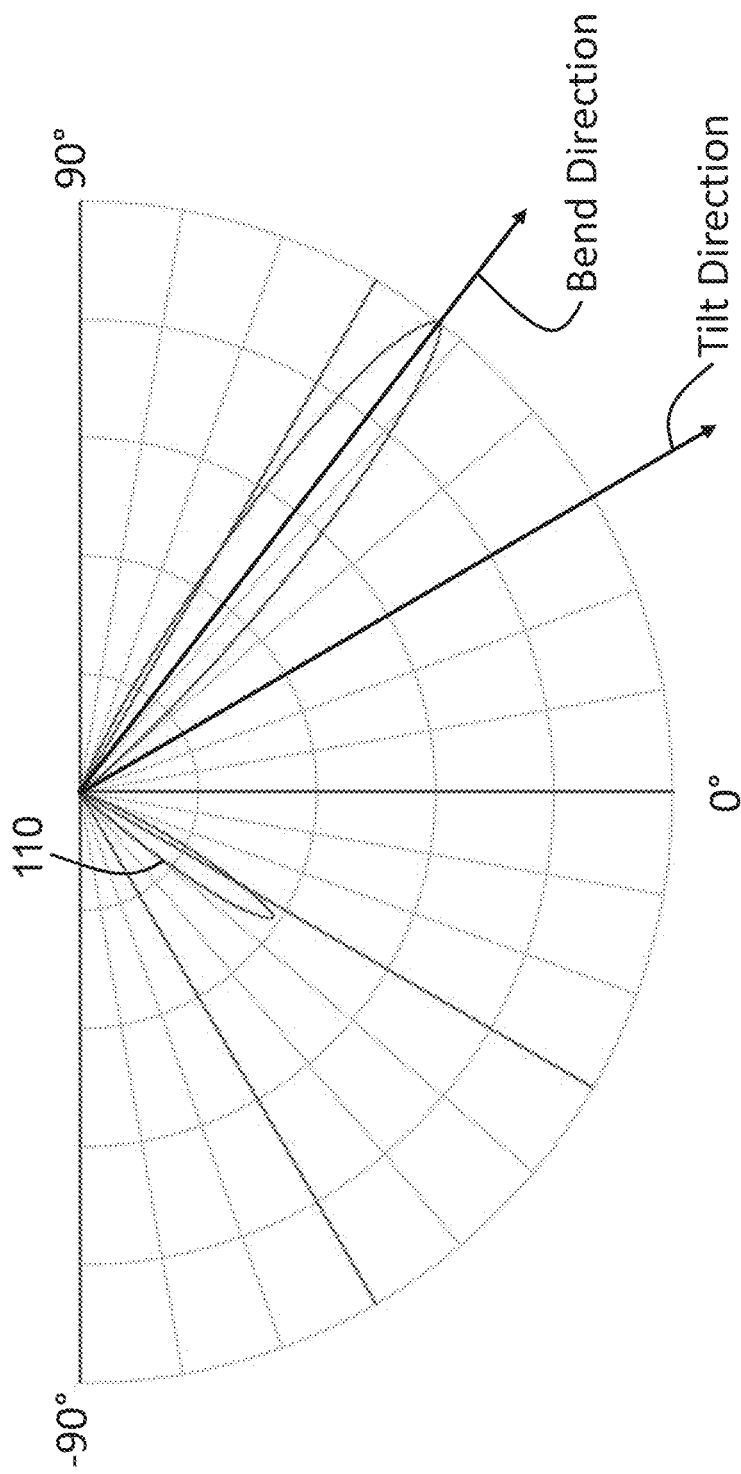
FIG. 18 is a polar plot of the source distribution of FIG. 17 after passing through a Luminit Direction Turning Film.

FIG. 18 illustrates the light distribution in the bending plane after the source distribution of FIG. 17 passes through a Luminit Direction Turning Film. As illustrated, the Luminit Direction Turning Film generally redistributed the light in a bend direction that is greater than +20° from the tilt direction, but also created an undesired secondary distribution 110 generally directed at an angle greater than −60° from the tilt direction.

Figure 19:
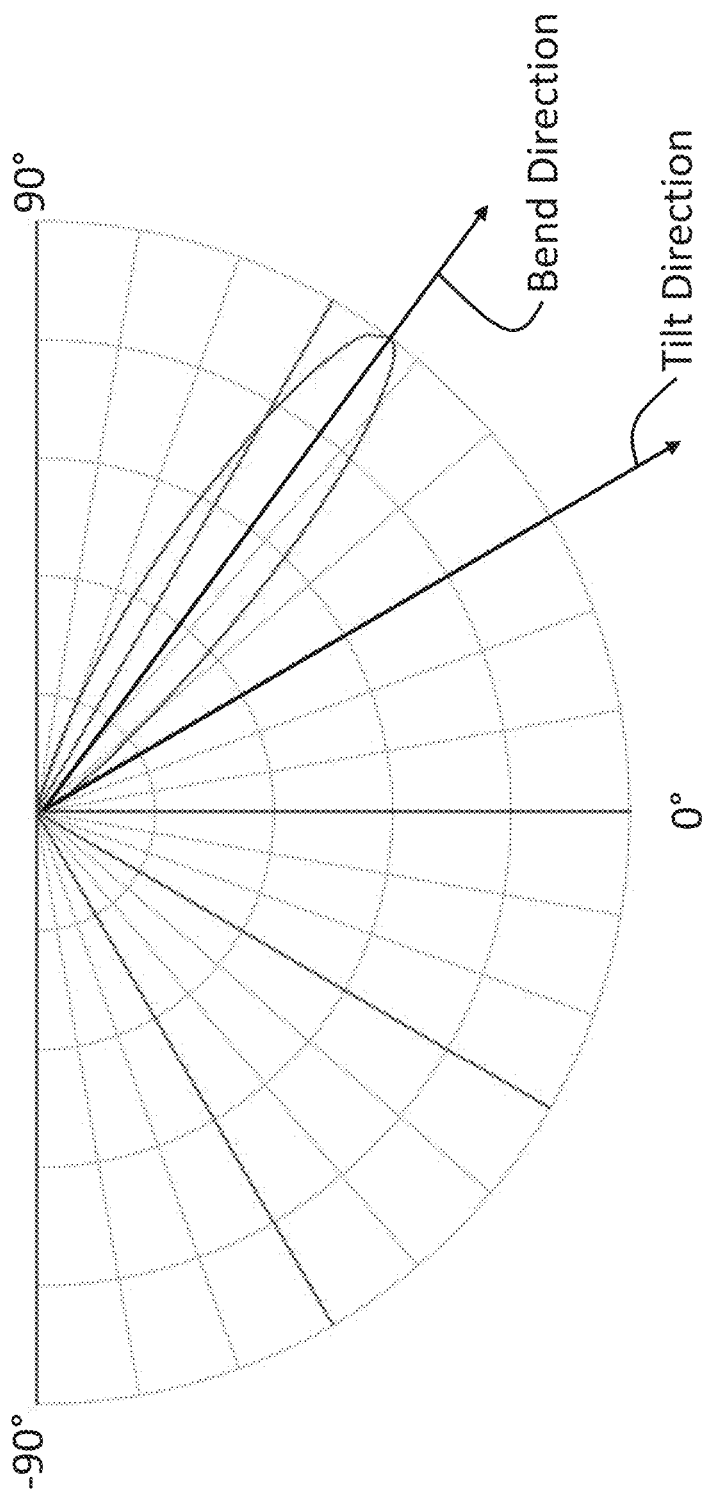
FIG. 19 is a polar plot of the source distribution of FIG. 17 after passing through a light transmissive structure having the microprisms of FIG. 8.

FIG. 19 illustrates the light distribution in the bending plane after the source distribution of FIG. 17 passes through a light transmissive structure 30 having the array 60 of microprisms 62 of FIG. 8. As illustrated, the light transmissive structure 30 redistributed the light in a bend direction that is greater than +20° from the tilt direction and did not create any secondary distributions.

The embodiments described herein represent a number of possible implementations and examples and are not intended to necessarily limit the present disclosure to any specific embodiments. Instead, various modifications can be made to these embodiments, and different combinations of various embodiments described herein may be used as part of the invention, even if not expressly described, as would be understood by one of ordinary skill in the art. Any such modifications are intended to be included within the spirit and scope of the present disclosure and protected by the following claims.

What is claimed is:

1. A light transmissive structure comprising:
a light transmissive substrate having first and second opposing faces; and
an array of microprism elements on the first face, each microprism element comprising a first inclined surface disposed at a first inclined angle relative to the second face, and a second inclined surface disposed at a second inclined angle relative to the second face, the first inclined angle being less than the second inclined angle, the second inclined surface having a convex curvature when viewed from angles perpendicular thereto, and at least two adjacent microprism elements having the same first inclined angle relative to the second face and the same inclined angle relative to the second face,
wherein the light transmissive structure is configured to receive light emitted from a light source facing the first face in a first direction and redistribute light emerging from the second face in a second direction different from the first direction.

2. The light transmissive structure according to claim 1, wherein the array of microprism elements is configured so that light emitted from the second face has an asymmetric distribution.

3. The light transmissive structure according to claim 1, wherein the first inclined angle is in the range of about 10 degrees to about 40 degrees.

4. The light transmissive structure according to claim 1, wherein the second inclined angle is in the range of about 40 degrees to about 100 degrees.

5. The light transmissive structure according to claim 1, wherein the microprism elements are arrayed on the light transmissive substrate in a grid along perpendicular rows and columns.

6. The light transmissive structure according to claim 5, wherein the microprism elements alternate position by one-half a period in each row.

7. The light transmissive structure according to claim 1, wherein the first inclined surface is substantially planar.

8. The light transmissive structure according to claim 1, further comprising a rippled pattern across the array of microprism elements, the rippled pattern having a plurality of peaks and a plurality of valleys.

9. The light transmissive structure according to claim 1, wherein at least some of the microprism elements are curved and nested.

10. The light transmissive structure according to claim 9, wherein the nested and curved microprism elements approximately fill a hexagonal shape.

11. The light transmissive structure according to claim 10, wherein the light transmissive structure comprises a plurality of hexagonal shapes comprising the curved and nested microprism elements.

12. A lighting system comprising:
a light source; and
a light transmissive structure spaced from the light source, the light transmissive structure comprising:
a light transmissive substrate having a first face facing the light source and a second face on an opposite side of the light transmissive substrate as the first face, and
an array of microprism elements on the first face, each microprism element comprising a first inclined surface disposed at a first inclined angle relative to the second face, and a second inclined surface disposed at a second inclined angle relative to the second face, the first inclined angle being less than the second inclined angle, the second inclined surface having a convex curvature when viewed from angles perpendicular thereto, and at least two adjacent microprism elements having the same first inclined angle relative to the second face and the same inclined angle relative to the second face,
wherein the light transmissive structure is configured to receive light emitted from the light source in a first direction and redistribute light emerging from the second face in a second direction different from the first direction.

13. The lighting system according to claim 12, wherein at least some of the microprism elements are curved and nested.

14. The lighting system according to claim 13, wherein the nested and curved microprism elements approximately fill a hexagonal shape.

15. The lighting system according to claim 13, wherein the light transmissive structure comprises a plurality of hexagonal shapes comprising the curved and nested microprism elements.

16. The lighting system according to claim 12, wherein the light emitted from the second face has an asymmetric distribution.

17. A light transmissive structure comprising:
a light transmissive substrate having first and second opposing faces; and
an array of microprism elements on the first face, each microprism element comprising a first inclined surface disposed at a first inclined angle relative to the second face, and a second inclined surface disposed at a second inclined angle relative to the second face, the first inclined angle being less than the second inclined angle, the second inclined surface having a convex curvature when viewed from angles perpendicular thereto, wherein at least some of the microprism elements are curved and nested,
wherein the light transmissive structure is configured to receive light emitted from a light source facing the first face in a first direction and redistribute light emerging from the second face in a second direction different from the first direction.

18. The light transmissive structure according to claim 17, wherein the nested and curved microprism elements approximately fill a hexagonal shape.

19. The light transmissive structure according to claim 18, wherein the light transmissive structure comprises a plurality of hexagonal shapes comprising the curved and nested microprism elements.

20. The light transmissive structure according to claim 18, wherein the light emitted from the second face has an asymmetric distribution.

* * * * *